United States Patent [19]
Bancroft et al.

[11] 3,784,829
[45] Jan. 8, 1974

[54] RADIANT ENERGY SELECTION MEANS

[75] Inventors: James R. Bancroft; Richard L. Cleavinger, both of Boulder, Colo.; James M. Hall, Bethesda; Mark Harris, Wheaton, both of Md.

[73] Assignee: Ball Brothers Research Corporation, Boulder, Colo.

[22] Filed: Sept. 3, 1971

[21] Appl. No.: 170,727

Related U.S. Application Data
[62] Division of Ser. No. 705,442, Feb. 14, 1968.

[52] U.S. Cl. .................... 250/203 CT, 250/203 R
[51] Int. Cl. ............................................. G01j 1/20
[58] Field of Search ..................... 250/203, 203 CT

[56] References Cited
UNITED STATES PATENTS
| | | | |
|---|---|---|---|
| 3,566,026 | 2/1971 | Bonebreak et al. | 250/203 CT X |
| 3,634,691 | 1/1972 | Bancroft et al. | 250/203 CT |
| 3,651,326 | 3/1972 | Alpers | 250/203 CT |

*Primary Examiner*—Archie R. Borchelt
*Attorney*—Gilbert E. Alberding

[57] ABSTRACT

An apparatus and method for conducting a search of a predetermined area for radiant energy utilizing a raster type scan and responsive to receipt of radiant energy automatically shifting the operational mode from search to track after which that portion of the predetermined area within which the radiant energy was located is repeatedly unidirectionally swept with each succeeding sweep being in quadrature relationship to the previous sweep. A pulse indicative of received radiant energy is produced during each sweep and if of sufficient magnitude, the leading and trailing edges are utilized to cause sampling of deflection currents at the time of occurrence of said leading and trailing edges. The thus sampled currents are averaged to produce an analog output signal indicative of the angular position of the source of the radiant energy within the predetermined area along the particular axis established by the sampled sweep currents. Also provided is a selection circuit whereby a particular source of radiant energy can be selected to the exclusion of other sources within the predetermined area.

13 Claims, 17 Drawing Figures

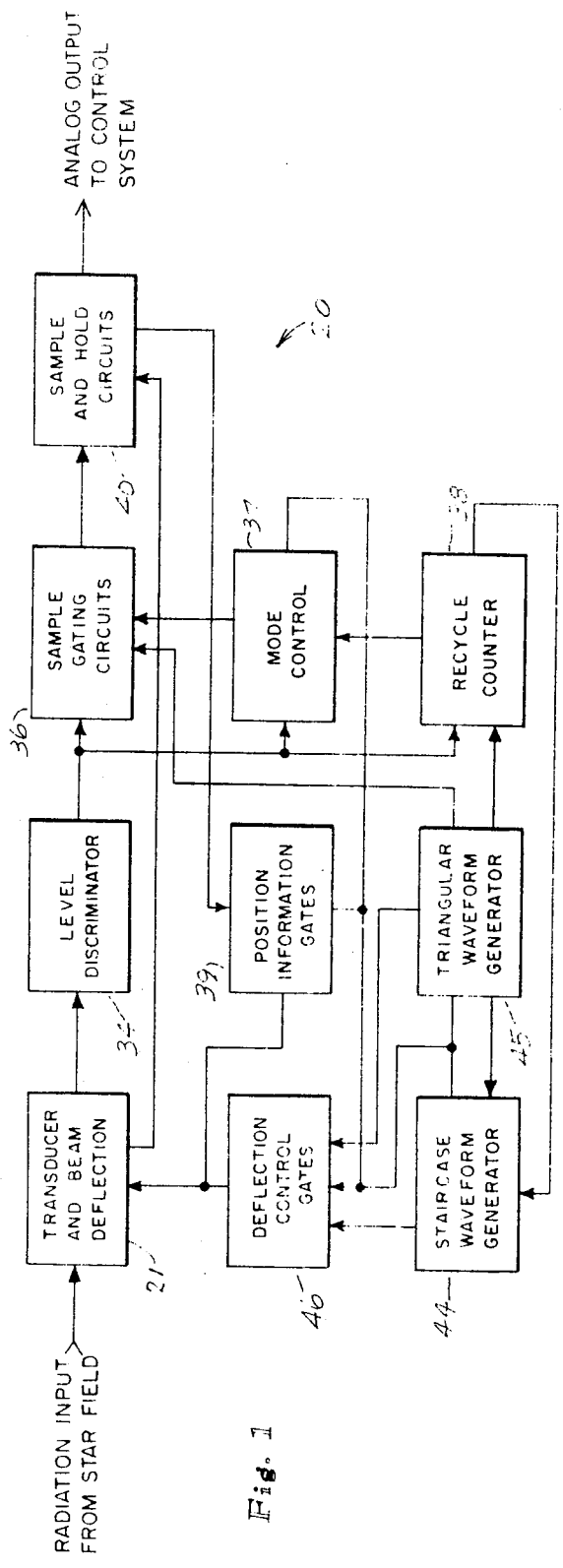
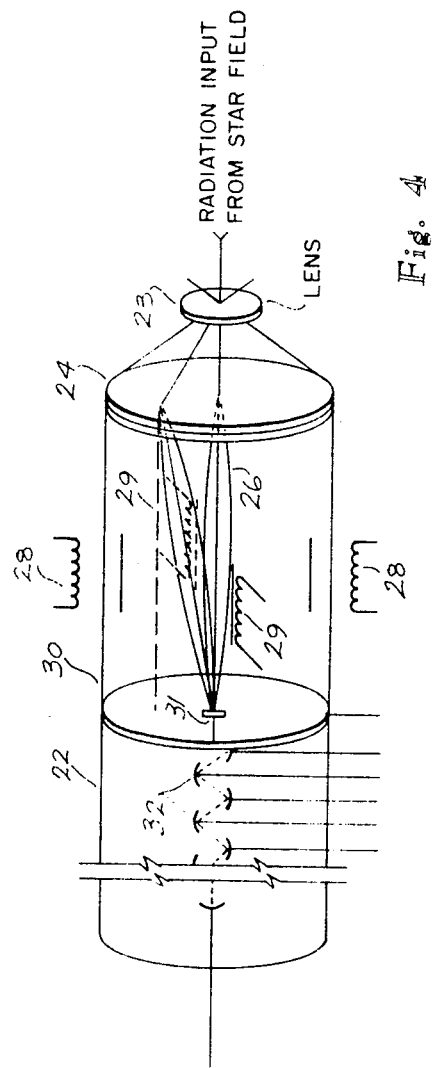
Fig. 1
Fig. 4

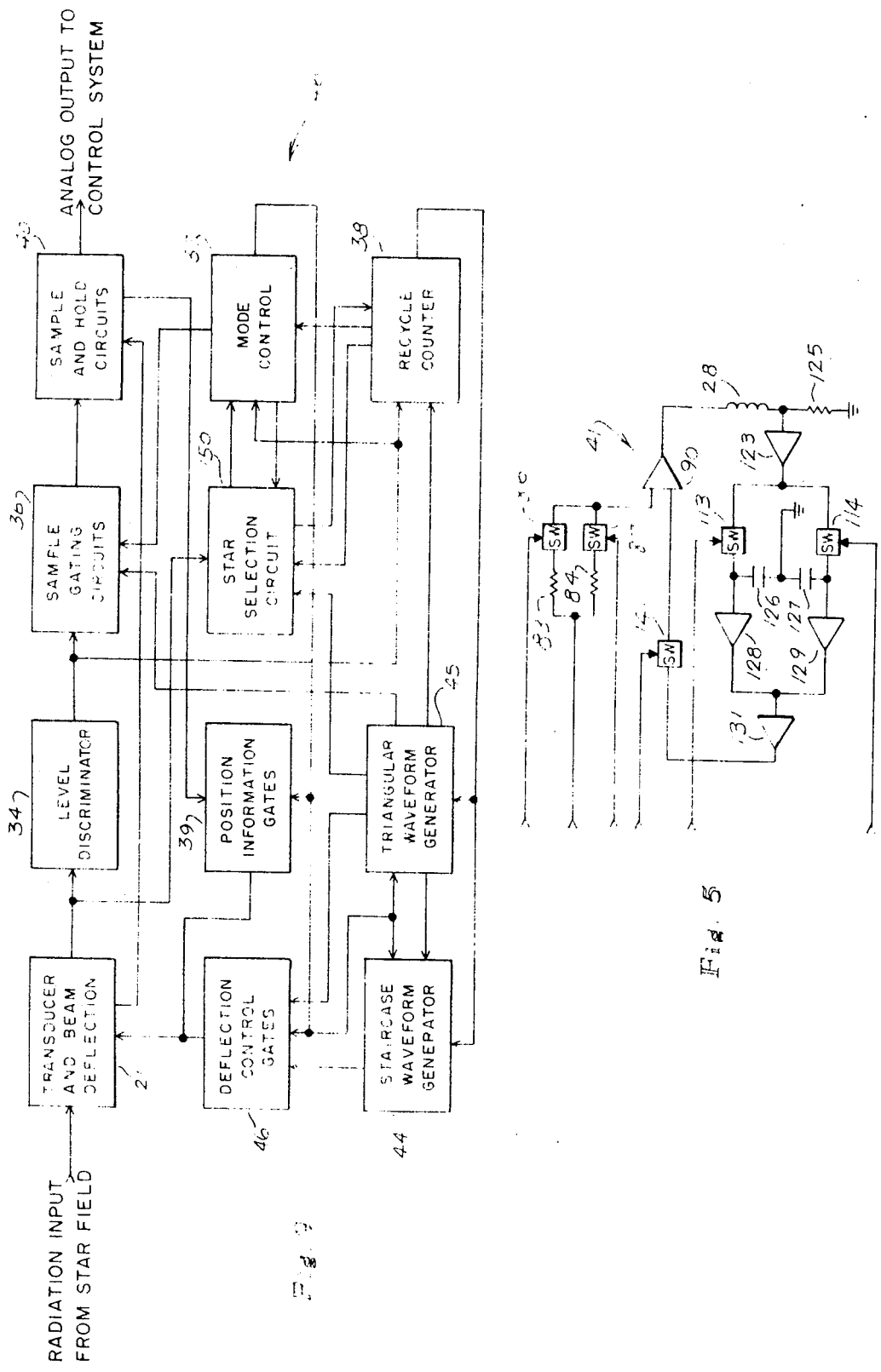

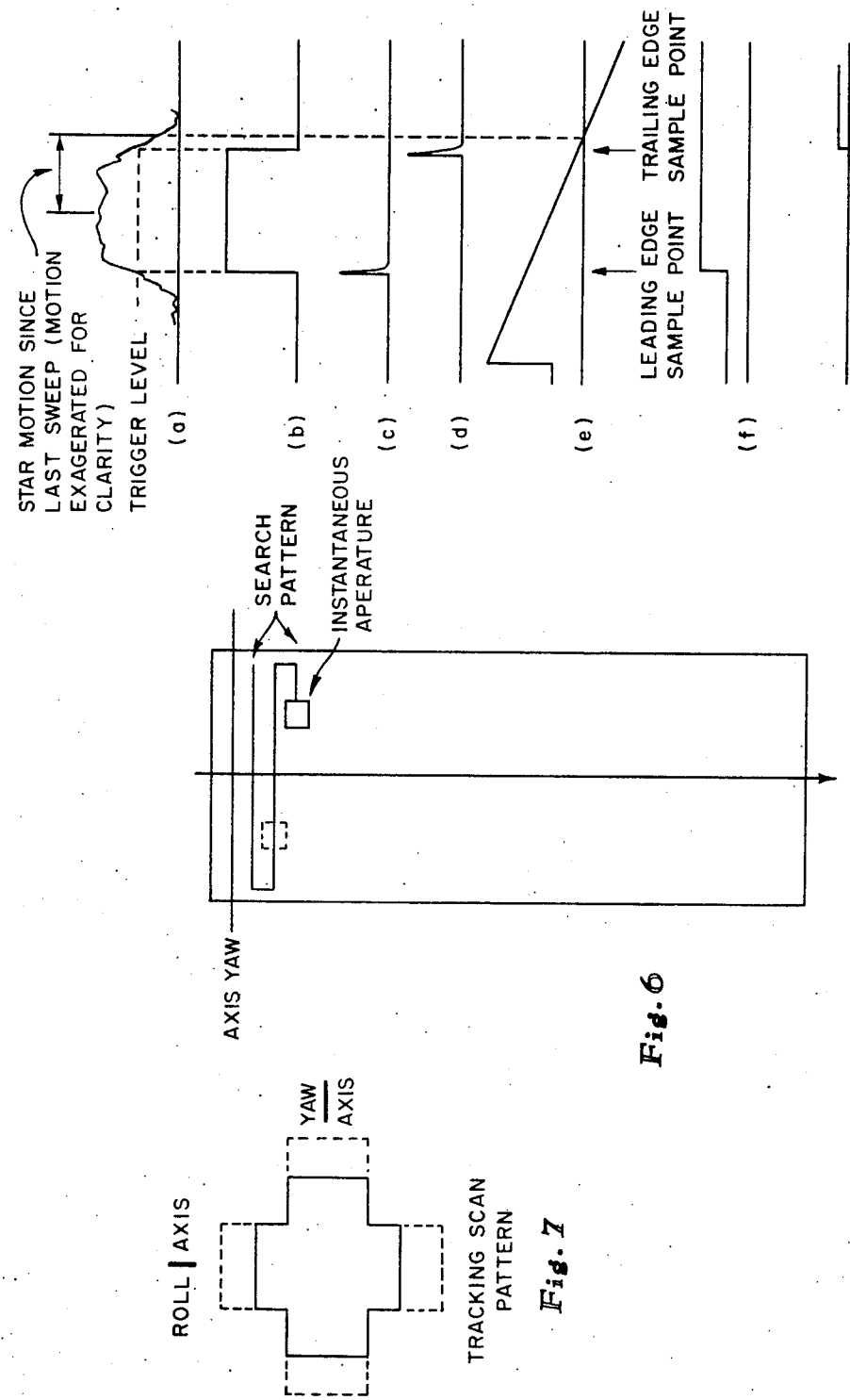

RADIANT ENERGY SELECTION MEANS

This application is a Divisional of our copending Application Ser. No. 705,442, filed Feb. 14, 1968, now U.S. Pat. No. 3,634,691 and entitled "Apparatus and Method for Sensing Radiant Energy and Determining the Position of the Source."

BACKGROUND OF THE INVENTION.

1. Field of the Invention.

This invention relates to a device and method for sensing the presence of radiant energy within a predetermined area and then automatically determining the angular position of the source of the received radiant energy within said predetermined area, and more particularly relates to such a device and method suitable for acquiring and tracking purposes.

2. Description of the Prior Art.

It is oftentimes necessary to provide apparatus capable of not only searching a broad area for a predetermined object or type of objects, but also capable of providing accurate positioning information with respect to the desired object within the broad search area. Since a broad search area often makes it impossible to accurately pinpoint objects within the area, such an area is commonly covered by increments so that at any particular instant only a portion of the predetermined area is under surveillance, or observation. Such is the case where radiant energy is the object of the search and the position of the source of the radiant energy is to be determined and the source thereafter tracked, as, for example, where radiant energy from a particular star is to be located, the angular position determined, and the star is to be thereafter tracked.

Segmented searches of a predetermined area for radiant energy may be commonly carried out by any type of scan wherein the entire area is covered within a short time period, as can be accomplished, for example, by a raster type scan. After the radiant energy has been sensed by field scanning techniques, however, it is usually still necessary to accurately determine the angular position of the source within the segment, or portion, of the area.

While it has heretofore been suggested that the segment under search at the time of sensing of the radiant energy could be repeatedly swept in many different configurations in order to determine the position of the source, and while systems and methods have been heretofore advanced for providing both the search and tracking functions, none of the prior art systems or methods have been completely satisfactory.

SUMMARY OF THE INVENTION

This invention provides an improved apparatus and method for sensing radiant energy wherein a segmented search of a predetermined area is carried out with the apparatus in a search mode, receipt of radiant energy causing the apparatus to automatically shift from the search mode to a track mode during which unidirectional sweeps are effected over that portion of a segment in which radiant energy has been sensed with each sweep being in angular relationship to the previous sweep so that a pulse is produced during each sweep indicative of received radiant energy, said pluse being utilized by novel means to determine the angular position of the source of said received radiant energy.

It is therefore an object of this invention to provide an improved radiant energy sensing apparatus capable of sensing radiant energy within a predetermined broad area and automatically thereafter accurately determining the angular position of the source of the energy within the area.

It is another object of this invention to provide an improved radiant energy sensing apparatus capable of performing a search utilizing a raster type scan and then automatically shifting operation when radiant energy is received to thereafter cause that portion of the area in which radiant energy was sensed to be repeatedly swept unidirectionally to determine the angular position of the source of the received radiant energy within said predetermined area.

It is still another object of this invention to provide radiant energy sensing apparatus having novel angular position determining means for determining the angular position of radiant energy within a predetermined area.

It is yet another object of this invention to provide a radiant energy sensing device having a novel angular position determining device wherein the leading and trailing edges of pulses indicative of received radiant energy are utilized to sample deflection currents at the time of occurrence of said leading and trailing edges, which currents are averaged to produce an analog signal indicative of the angular position of the radiant energy along the particular axis established by the sampled sweep currents.

It is still another object of this invention to provide a radiant energy sensing device having means for automatically re-establishing search whenever radiant energy is not received for a predetermined time during tracking of the source of said energy.

It is still another object of this invention to provide a radiant energy sensing device having means for selection of a particular source of radiant energy within a predetermined area.

It is still another object of this invention to provide a radiant energy sensing device having radiant energy selection means whereby a predetermined level of radiant energy is selected within the area of search and the position of that energy determined.

It is still another object of this invention to provide a process for sensing radiant energy in a predetermined area by scanning the area and then measuring deflection currents to obtain the position of the energy within the area.

It is still another object of this invention to provide a process for sensing radiant energy wherein radiant energy to be tracked is preselected and the position of that preselected energy thereafter determined.

With these and other objects in view, which will become apparent to one skilled in the art as the description proceeds, this invention resides in the novel construction, combination, arrangement of parts, and method substantially as hereinafter described, and more particularly defined by the appended claims, it being understood that such changes in the precise embodiments of the hereindisclosed invention are meant to be included as come within the scope of the claims.

BRIEF DESCRIPTION OF THE DRAWINGS.

The accompanying drawings illustrate two complete embodiments of the invention according to the best mode so far devised for the practical application of the principles thereof, and in which:

FIG. 1 is a block diagram of one embodiment of the radiant energy sensing device of this invention;

FIG. 4 is a schematic cross section of an image dissector tube which can be utilized in this invention as a part of the transducer indicated in FIG. 1 and the image dissector indicated in FIG. 2;

FIG. 5 is a partial block diagram showing in particular, the internal servo loop which forms a portion of the broad block diagram of FIGS. 2 and 3;

FIG. 6 is a typical scan presentation showing the raster type scan utilized with the embodiment of the invention shown in FIGS. 1 through 3;

FIG. 7 is a typical presentation of the tracking scan pattern of this invention;

FIG. 8 is a series of typical waveforms present at indicated points in the invention as shown in FIG. 1;

FIG. 9 is a block diagram of a second embodiment of this invention utilizing a radiant energy selection circuit;

DESCRIPTION OF THE PREFERRED EMBODIMENTS.

Figure 2:
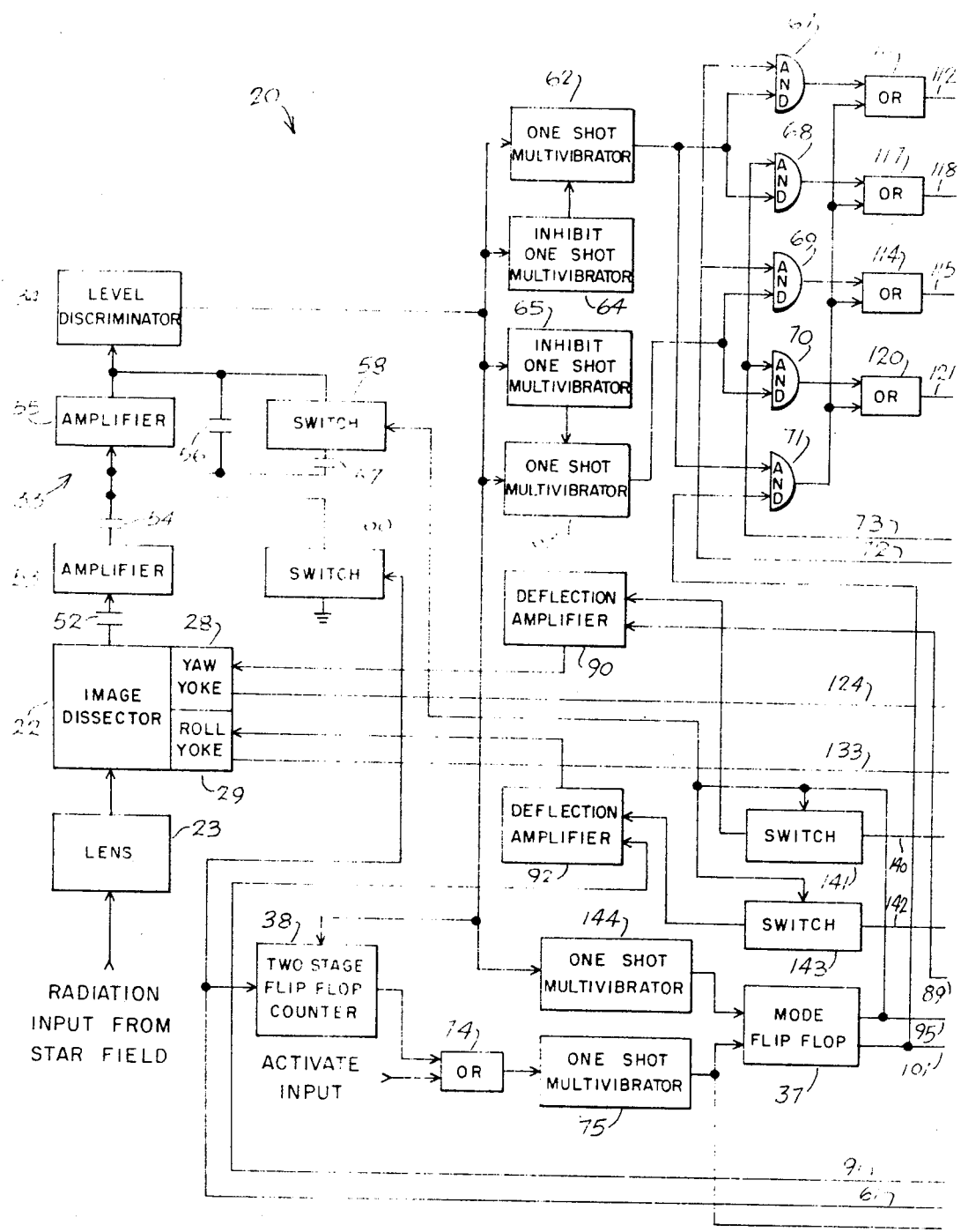
FIGS. 2 and 3 taken together form an expanded block diagram of the embodiment of the invention shown in FIG. 1.
Figure 3:
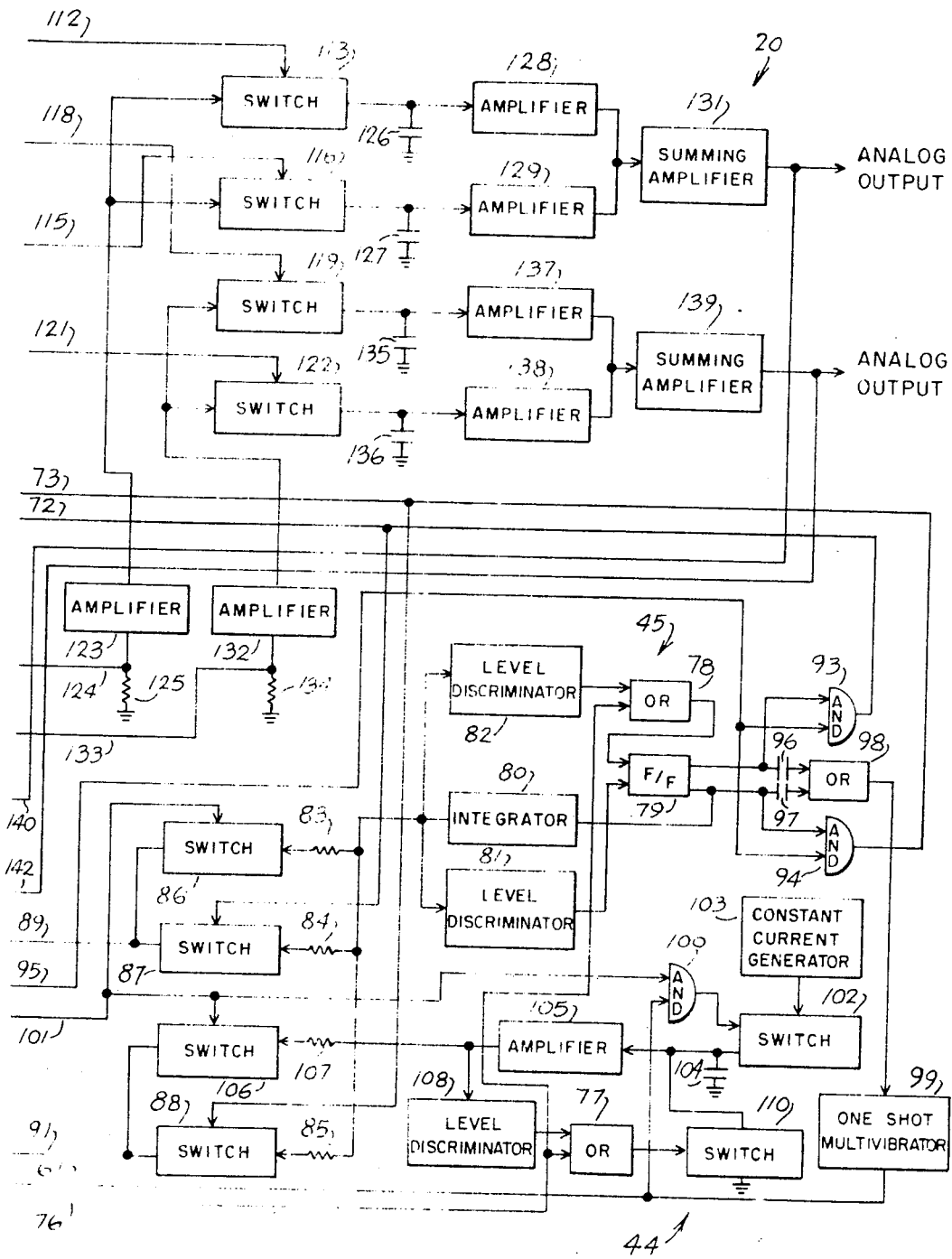

Referring now to the drawings, the number 20 refers generally to the radiant energy sensing apparatus of this invention as shown in FIGS. 1 through 3. As shown in FIG. 1, the radiant energy input from a star field, for example, is coupled to transducer and beam deflection means 21.

Transducer 21 transforms the received radiant energy into a stream of electrons and for this purpose includes a photomultiplier tube, preferably an image dissector tube 22, shown in essence in schematic cross-section in FIG. 4. As is conventional, image dissector tube 22 has a lens 23 in front thereof which directs the received radiant energy to a photosensitive cathode 24. As is well known in the art, when the radiant energy impinges upon the photosensitive cathode, a stream of electrons 26 is emitted from the photosensitive cathode, the path of which stream is controlled by deflection coils 28 and 29 prior to the stream of electrons striking image dissecting plate 30.

Image dissecting plate 30 has an aperture 31 therein, the size and shape of which aperture determines the size of the portion, or segment, to be instantaneously observed during search. As shown best in FIG. 6, the aperture selected can be of square configuration which, of course, allows a square area to be searched by the raster type scan. If desired for a particular purpose, the aperture could be of other configuration, such as rectangular or circular, for example, and this invention is not meant to be limited to the exact configuration shown herein. As is conventional, the electron stream is controlled by control of the current to the deflection coils to effect the type of search desired.

The electrons that pass through aperture 31 reach a series of dynodes 32, as shown in FIG. 4, for multiplying the signal as is well known in the art, before the pulse output is taken from the tube. While not shown in FIG. 4, tube 22 may also conventionally utilize focusing coils, (or be electrostatically focused), a filter, a high voltage power supply, and a preamplifier.

The energy available from a star field is relatively small, being on the order of $10^{-12}$ W/cm$^2$ or less and hence photomultipliers, image intensifiers, vidicon tubes, or image orthicon tubes, which are capable of handling low energy signals, are commonly utilized. Of the types of energy sensors available, the image dissector tube has proven to be preferable for use, but other types might also be usable and/or preferable in particular situations. Image dissector tube 22 may be a type F 4004, manufactured by ITT Industrial Laboratories, Fort Wayne, Indiana.

Again referring to FIG. 1, the pulse output from transducer and beam deflection means 21 is coupled to level discriminator 34 (which is a part of signal processing circuitry 33 shown in FIG. 2). Level discrimination 34 is conventional and will not generate an output pulse until such time as the received pulse is of at least a predetermined magnitude, as indicated by the typical pulse shown in FIG. 8(a). When this occurs, level discriminator 34 produces an output pulse such as shown typically in FIG. 8(b). The level discriminators utilized in this invention may be, for example, open loop operational amplifiers with a reference level on one input and the signal on the other input.

The output from level discriminator 34 is coupled to sample gating circuits 36, mode control 37, and recycle counter 38. Sample gating circuits 36 receive the output from the level discriminator and produce a narrow pulse indicative of the leading edge of the pulse from the level discriminator followed by a second narrow pulse indicative of the trailing edge of said pulse from the level discriminator, as shown by the typical pulses depicted in FIGS. 8(c) and 8(d).

The output pulse from level discriminator 34 coupled to mode control 37 causes the mode control to shift operation between a first, or search, mode, and a second, or track, mode. Mode control 37 is conventional and is preferably a flip-flop. Mode control 37 supplies outputs to both the sample gating circuits 36 and position information gates 39 to permit outputs therefrom only when the apparatus is being operated in the track mode.

The leading and trailing edge pulses from sample gating circuits 36 are coupled to sample and hold circuits 40. Sample and hold circuits 40 are connected with the deflection coils 28 and 29 and, when in track mode, form in conjunction therewith and with position information gates 39, an internal servo loop 41, as shown best in FIG. 5. The deflection coil drive signal, as shown typically in FIG. 8(e) supplies deflection currents to the coils so that a linear scan is achieved. The sample and hold circuits sample the deflection currents at the time of occurrence of the leading edge of the pulse from the level discriminator and again at the time of occurrence of the trailing edge, the sampled currents being shown by the typical waveforms of FIGS. 8(f) and 8(g). These current levels are then averaged as shown by the typical waveform of FIG. 8(h), so that the output from each sample and hold circuit (there is one circuit for each axis swept) is indicative of the angular position of the radiant energy at that particular time and along the particular axis swept. If roll and yaw axes are swept, for example, as indicated in FIGS. 2 and 3, then the averaged outputs will be indicative of the angular position of the radiant energy along these two axes. The averaged analog output signal can, of course, be used for tracking purposes and can be converted to a digital signal, if desired, and the signal can be utilized to determine, for example, the angular direction between line of sight to the source tracked and the pitch-yaw plane of a spacecraft.

The unidirectional scan is utilized when the apparatus is in the track mode to cut down noise due to electronic signal processing delays inherent in the system. By utilizing a unidirectional scan, the apparent angular position of the received radiant energy is constant relative to true position rather than varying as would occur whenever a multi-directional sweep is utilized. For example, in a bidirectional sweep, the apparent angular position would occur at two points separated by an angle proportional to the electronic signal processing delays, rather than being constant as occurs with a unidirectional sweep and can therefore be easily compensated.

By storing the sampled currents, a bias is provided so that each sweep along a given axis will be where the radiant energy was located during the previous sweep along that axis. Obviously, this bias is automatically updated at each sweep along the axis.

The drive signals to the deflection coils are supplied by a staircase waveform generator 44 and a triangular waveform generator 45 connected with the coils through deflection control gates 46 in a gating sequence such as will produce the proper drives. Staircase generator 44 is connected to only one deflection coil (the roll deflection coil as indicated in FIG. 2) and only when the apparatus is in the search mode, while triangular waveform generator 45 is connected to the other deflection coil during operation in the search mode (so that the two generators effect a raster type scan) and to both deflection coils during the track mode to effect unidirectional sweeps in each of the two axes to be swept. Both staircase generator 44 and triangular generator 45 are controlled by mode control 37, so that when the mode is changed to track, the staircase generator is disconnected from the roll deflection coil and the triangular generator connected therewith through the gates to effect the desired sweeps.

As also shown in FIG. 1, the output from level discriminator 34 is coupled to recycle counter 38. This counter is preferably a two-stage flip-flop, as shown best in FIGS. 2 and 3, and receives the output from the level discriminator and also an output from triangular waveform generator 45. If no pulse is received from level discriminator 34, the output from the triangular waveform generator 45 will, after two cycles, cause recycle counter 38 to produce an output which is coupled to mode control 37, staircase waveform generator 44, and triangular waveform generator 45, to cause the operational mode to automatically revert to search so that the device will automatically re-establish search whenever radiant energy is lost for any reason.

Figure 16:
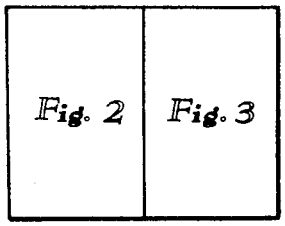
FIGS. 16 and 17 show how FIGS. 2 and 3, and FIGS. 10 through 12, respectively, may be placed together to form composite block diagrams.

Referring now to FIGS. 2 and 3, which taken together, as shown in FIG. 16, form an expanded block diagram of the embodiment of the invention shown in FIG. 1. The radiation input from the star field is coupled through lens 23 to image dissector 22, in which roll and yaw yoke deflection coils 28 and 29 control the electron stream, as brought out hereinabove.

As shown in FIG. 2, the output from image dissector 22 is coupled to signal processing circuitry 33 and, more particularly, through coupling capacitor 52, amplifier 53, coupling capacitor 54, and amplifier 55, to level discriminator 34. The amplifiers utilized in this invention may be conventional operational amplifiers.

A filter consisting of capacitor 56 having in parallel therewith capacitor 57 and switch 58 is connected in parallel with amplifier 55. Switch 58 is controlled by mode control 37 and is closed only when the apparatus is operated in the track mode to adapt the time constant to the pulse characteristics of the track mode.

In addition, a DC restorer is provided by a switch 60 connected to ground at one side and to the junction of capacitor 54 and amplifier 55 at the other side. Switch 60 is controlled by logic output on lead 61 derived from the triangular waveform generator 45, which is shown in FIG. 3. The switches utilized in this invention are shown in the block diagrams with an arrow for the switch control. These switches may include field effect transistors for the digital-to-analog switches connected with the drain and source in the analog line and the switching function provided by gate bias to open or close the path, while the gating switches may be mechanized with simple diode and transistor logic.

The output from level discriminator 34 is coupled to a pair of one-shot multivibrators 62 and 63, multivibrator 62 being triggered by the leading edge of the received pulse from the level discriminator while multivibrator 63 is triggered by the trailing edge of the same pulse. A pair of INHIBIT one-shot multivibrators 64 and 65 are provided to receive the pulse from the level discriminator and are connected to the leading edge and trailing edge one-shot multivibrators, as shown in FIG. 2.

Leading edge INHIBIT one-shot multivibrator 64 produces a pulse which is timewise slightly longer in duration than is the pulse from level discriminator 34. This prevents spurious firing of the leading edge one-shot multivibrator, such as could occur, for example, if the level discriminator should stutter.

Figure 13:
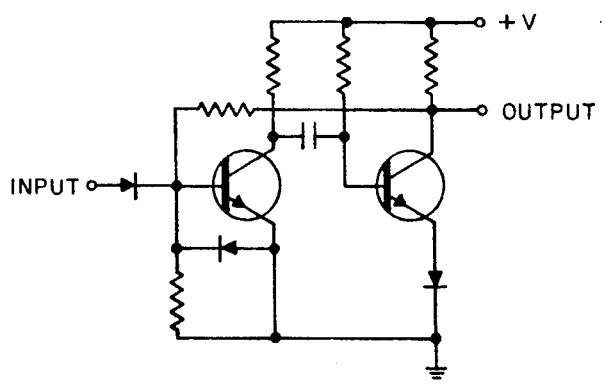
FIG. 13 is a schematic diagram of a one-shot multivibrator which may be utilized in this invention.

The trailing edge INHIBIT one-shot multivibrator 65 produces an output at the same time as the leading edge INHIBIT one-shot multivibrator but has a time duration equal to approximately one-half that of the level discriminator. The purpose of this one-shot multivibrator is to prevent the trailing edge one-shot multivibrator from firing prior to the actual end of the pulse. The one-shot multivibrators utilized in this invention are conventional and FIG. 13 illustrates a typical one-shot multivibrator that can be utilized.

The pulse from leading edge one-shot multivibrator 62 is coupled to AND gates 67 and 68, while the output pulse from trailing edge one-shot multivibrator 63 is coupled to AND gates 69 and 70. In addition, a fifth AND gate 71 receives the output pulse from the leading edge one-shot multivibrator 62.

The second input to AND gates 67 through 70 is coupled thereto from the triangular waveform generator 44, and more particularly from logic outputs derived therefrom, while the second input to AND gate 71 is coupled thereto from mode control 37.

As shown in FIGS. 2 and 3, the logic derived inputs (from triangular waveform generator 45) to AND gates 67 and 69 are coupled thereto in common through lead 72, as are the logic derived inputs to AND gates 68 and 70 through lead 73. As shown in FIG. 3, these logic-derived AND gate inputs are logical opposites so that an input is coupled to AND gates 67 and 69 or to AND gates 68 and 70 but not to both sets at the same time. As can be seen from FIGS. 2 and 3, AND gates 67 and 69 receive the leading and trailing edge pulses for the yaw axis, while AND gates 68 and 70 receive the leading and trailing edges of the pulses for the roll axis.

The triangular waveform is generated in a conventional manner, as shown in FIG. 3. An activating input is coupled through OR gate 74 (as shown in FIG. 2) which triggers one-shot multivibrator 75, which multivibrator produces an output to cause the mode control 37 to reset (or assume the search mode) and also provides an input through lead 76 and OR gate 77 to staircase waveform generator 44 and through lead 76 to OR gate 78 in triangular waveform generator 45.

As shown in FIG. 3, the output from OR gate 78 is coupled to one side of flip-flop 79 of generator 45. One output from flip-flop 79 (the reset output as shown in FIG. 3) is coupled to a conventional integrator 80 which produces an output signal that increases when the flip-flop is in one state and decreases when it is in the other state, as is well known in the art. As the integrator output increases to a predetermined point, level discriminator 81 is triggered and the output therefrom is coupled back to flip-flop 79 to cause it to change states. At this point, the integrator output starts to decrease and continues to decrease until such time as level discriminator 82 is triggered to produce an output which is coupled to the other side of flip-flop 79 to cause the flip-flop to again change states.

Figure 14:
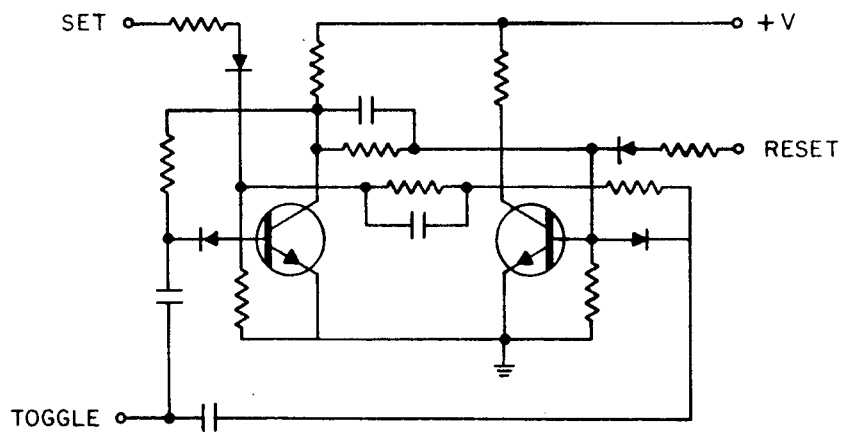
FIG. 14 is a schematic diagram of a flip-flop, or bistable multivibrator, which may be utilized in this invention.

Thus, a triangular waveform is produced at the output of the integrator, and as shown in FIGS. 2 and 3, this triangular waveform is coupled through resistors 83, 84, and 85, to switches 86, 87, and 88, which are the deflection control gates referred to in FIG. 1 (a fourth deflection control gate is provided for the staircase waveform as brought out hereinafter). As shown in FIGS. 2 and 3, switches 86 and 87 are connected through lead 89 to deflection amplifier 90, which in turn is connected to yaw yoke 28, while switch 88 is connected through lead 91 to deflection amplifier 92, which in turn is connected to the roll yoke 29. The flip-flops utilized in this invention are conventional and a schematic diagram of a flip-flop that can be utilized is shown in FIG. 14.

The logic outputs derived from triangular waveform generator 45 are taken from the outputs of flip-flop 79. As can be seen in FIG. 3, the set output from flip-flop 79 is coupled to AND gate 93, while the reset output is coupled to AND gate 94. The second input to the AND gates 93 and 94 is supplied from mode control 37 through lead 95 so that the logic outputs are supplied only when the apparatus is in the track mode.

The outputs from flip-flop 79 are coupled through either capacitors 96 or 97 to OR gate 98, which gate is connected to one-shot multivibrator 99. The output pulse from one-shot multivibrator 99 is coupled through lead 61 to staircase waveform generator 44 and also controls DC restorer switch 60, as brought out hereinabove.

Staircase generator 44 receives the output from one-shot multivibrator 99 at AND gate 100, which AND gate also receives an input from the reset side of mode control 37, through lead 101 since the staircase generator produces an effective output only during the search, or acquisition, operating condition, or mode.

In staircase generator 44, the output from AND gate 100 controls a switch 102, which switch, when closed, allows the output of a constant current generator 103 to be coupled to a remainder of the circuitry to charge capacitor 104, one side of which is grounded. Isolation amplifier 105 is connected to capacitor 104 and provides the staircase waveform which is coupled to switch 106 through resistor 107. Switch 106 is a deflection control gate and when closed (the switch is controlled by mode control 37 through lead 101 and is closed when the apparatus is in the search mode), a staircase waveform signal is coupled to the roll yoke to establish the raster type scan (when the triangular waveform is coupled to the yaw yoke).

The output from isolation amplifier 105 is also coupled to level discriminator 108. When the output of the isolation amplifier reaches a predetermined voltage (equivalent to the last desired line of the raster type scan, i.e., the end of a frame), the level discriminator is triggered to produce an output which closes switch 110 (through OR gate 77). Since switch 110 connects the input side of the isolation amplifier to ground, closing of this switch causes capacitor 104 to discharge to ground, which, of course, restarts the entire raster scan. Since OR gate 77 also receives an input from activating one-shot multivibrator 75, the raster always starts at the first line and continues through a full sweep each time that the apparatus is activated.

The output from AND gate 67 (which is the leading edge pulse for the yaw axis), which, of course, occurs only when the leading edge pulse is recived from one-shot multivibrator 62 along with the output from AND gate 93, is coupled through OR gate 111 and lead 112 to control switch 113 in the sample and hold circuits. Likewise, the output from AND gate 69 (which is the trailing edge pulse for the yaw axis) is coupled through OR gate 114 and lead 115 to control switch 116, in the sample and hold circuits. In like manner, the output from AND gate 68 (which is the leading edge pulse for the roll axis) is coupled through OR gate 117 and lead 118 to control switch 119 in the sample and hold circuits, while the output from AND gate 70 (which is the trailing edge pulse for the roll axis) is coupled through OR gate 120 and lead 121 to control switch 122 in the sample and hold circuits.

A second input to OR gates 111, 114, 117, and 120, is coupled from the output of AND gate 71, as brought out hereinabove. Since the output from AND gate 71 occurs when the mode control is in the search condition and the leading edge pulse from multivibrator 62 is received by the AND gate, all four OR gates 111, 114, 117, and 120, pass a pulse just before the apparatus shifts from the search mode to the track mode.

Figure 15:
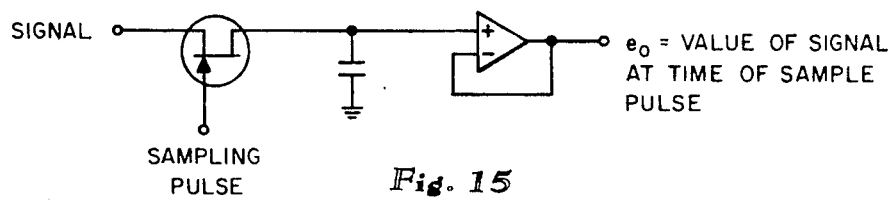
FIG. 15 is a schematic diagram of a sample and hold circuit which may be utilized in this invention.

Switches 113 and 116 are connected at one side in common to the output side of buffer amplifier 123, the input side of which amplifier is connected to the yaw deflection coil through lead 124 (a resistor 125 to ground is also provided). The other side of switch 113 is connected to one side of charging capacitor 126 (the other side of which is grounded), while the other side of switch 116 is connected to one side of charging capacitor 127 (the other side of which is also grounded). The junction of switch 113 and capacitor 126 is connected to the input side of amplifier 128, while the junction of switch 116 and charging capacitor 127 is connected to the input side of amplifier 129. The outputs from amplifiers 128 and 129 are then coupled to summing amplifier 131. The sample and hold circuits employ an operational amplifier connected in the voltage follower or electrometer configuration as shown in FIG. 15.

Thus, it can be seen that the increasing current supplied to the yaw deflection coil from the triangular waveform generator during the sweep along the yaw axis is sampled by the sample and hold circuit at the time the leading edge occurs and again at the time the trailing edge occurs since switch 113 is briefly closed when the leading edge occurs and switch 116 is briefly closed when the trailing edge then later occurs. The current level is stored on the charging capacitors and an output produced by amplifiers 128 and 129 and coupled to summing amplifier 131. Summing amplifier 131 has a gain of 0.50 so that the output therefrom is the average of the two currents coupled through amplifiers 128 and 129 resulting in an analog output signal being produced by summing amplifier 131 which is indicative of the center position along the yaw axis of the received radiant energy within the predetermined area of search.

In like manner, switches 119 and 122 are connected at one side in common to the output side of buffer amplifier 132, the input side of which amplifier is connected to the roll deflection coil through lead 133 (a resistor 134 to ground is also provided). The other side of switch 119 is connected to one gate of charging capacitor 135 (the other side of which is grounded), while the other side of switch 122 is connected to one side of charging capacitor 136 (the other side of which is grounded). The junction of switch 119 and capacitor 135 is connected to the input side of amplifier 137, while the junction of switch 122 and capacitor 136 is connected to the input side of amplifier 138. The outputs from amplifiers 137 and 138 are then coupled to summing amplifier 139. Summing amplifier 139 also has a 0.50 gain, so that the output from this amplifier is the average current sampled along the roll axis and the analog output is indicative of the center position of received radiant energy along this axis within the predetermined area of search.

The output from summing amplifier 131 is coupled through lead 140, switch 141 (which is one of the position information gates 39), the deflection amplifier 90, to the yaw yoke, while the output from summing amplifier 139 is coupled through lead 142, switch 143 (which is the other switch of position information gates 39), and deflection amplifier 91 to the roll yoke. As shown best in FIG. 5, this completes an internal servo loop for each axis (the yaw axis being illustrated) and the analog output signals serve as bias during operation in the tracking mode so that each sweep in each axis is through the point where the radiant energy was last located. At the time of each succeeding unidirectional sweep, the stored position information is, of course, updated.

Position switches 141 and 143 are controlled by an output from the set side of the mode control 37 so that these switches are closed whenever the apparatus is in the search mode.

In operation and as can be seen from FIGS. 2 and 3, mode control 37 is initially reset to the search condition upon initial activation. The mode control will remain in the search condition so long as radiant energy is not received of sufficient magnitude to trigger an output from level discriminator 34.

While in the search mode, the staircase waveform generator 44 will provide an output to the roll axis and triangular waveform generator 45 will supply an output to the yaw axis to create the raster type scan, as shown in FIG. 6. When level discriminator 34 produces an output, this output is coupled through one-shot multivibrator 144 to mode control 37 to change operation to the track mode. The track mode is then maintained until the apparatus is either deactivated for some reason or until the radiant energy is lost and the apparatus automatically recycled.

As shown in FIG. 2, the activate input is coupled through OR gate 74 to one-shot multivibrator 75, the output from which is coupled to mode control 37 to reset the same, as brought out hereinabove. Automatic recycling occurs by monitoring the output from the triangular waveform generator. As shown in FIG. 3, the outputs from flip-flop 79 are coupled through capacitors 96 and 97 and OR gate 98 to one-shot multivibrator 99. The output from multivibrator 99 is then coupled through lead 61 to two-stage flip-flop counter (recycle counter) 38, which counter also receives a second input from level discriminator 34. During each one-half cycle of the triangular waveform generator (one sweep), the flip-flop advances one stage. If an output is received from the level discriminator, then the counter is reset each time. However, if no pulse is received from the level discriminator for four sweeps, the flip-flop counter will cause an output to be produced that is coupled through OR gate 74 and one-shot multivibrator 75 to reset the mode control to re-establish the search mode.

During search, the raster type scan, as shown in FIG. 6, is preferably right to left, and left to right alternately throughout the entire search area. While the size of the aperture will determine, of course, the segment, or portion, to be searched at any instantaneous time, the amount of step of the staircase waveform generator will determine how much overlap there is between horizontal scans. It has been found that with an area 8° square, an aperture of 0.014 inch square, referred to the cathode, a search in fifty (50) sweeps with a small overlap is achieved. By establishing a sweep rate of 0.0025 second per sweep, it would thus take 0.125 second for a frame if no radiant energy is received.

In the track mode, the roll and yaw axes are alternately swept, as shown in FIG. 7, preferably right to left in the yaw axis and bottom to top in the roll axis. As the yaw axis is swept, for example, the occurrence of the leading edge of the pulse will cause an output from the AND gate to sample the deflection current in that axis at the instant of time. Likewise, at the trailing edge, the trailing edge AND gate will produce an output to cause the deflection current to be sensed at that particular instant of time. These currents are then averaged in the summing amplifier so that the output is an analog signal that is indicative of the center position of the radiant energy source within the predetermined area at that time. The roll axis is then swept and the current sensed and averaged in the same manner so that the position of the second axis is established. As will be readily apparent, the analog output signals from the summing amplifiers can be used as error signals for tracking purposes or the like.

If desired, the internal servo loop could be disabled after the source of radiant energy has been centered in the predetermined area under search. If this did occur (as for example, by opening a switch (not shown) in each servo loop), the apparatus would again automatically revert to the search mode should the radiant energy not be received thereafter, in the same manner as described hereinabove.

FIG. 9 shows a second embodiment of the star tracker of this invention, which star tracker, designated by the numeral 146, is similar in structure to that shown in FIG. 1, except that a star selection circuit 150 has been added wherein received radiant energy is sensed and only a predetermined source of radiant energy is selected for tracking purposes.

As shown in FIG. 9, the radiant energy input is coupled to transducer and beam deflection means 21 and the pulse output therefrom coupled to level discriminator 34. The output from the level discriminator is then coupled to the sample gating circuits 36, mode control 37, and recycle counter 38, with the output from the sample gate circuits being coupled to the sample and hold circuits 40, the output from which is coupled through the position information gate 39 to provide the bias for the beam deflection coils in the same manner as described hereinabove with respect to FIG. 1. In addition, mode control 37 operates in the same manner, supplying an output to the sample gating circuits 36, to the deflection control gates 46, and to the staircase and triangular waveform generators 44 and 45.

In the embodiment shown in FIG. 9, however, the output from the transducer is also coupled to star selection circuit 150, which circuit also receives inputs from the triangular waveform generator 45 and mode control 37, and provides an output to recycle counter 38, as well as receiving an input therefrom.

In essence, star selection circuit 150 receives, in sequence, all outputs from transducer 21 (providing said outputs exceed the preset threshold of level discriminator 34) and stores the highest level. After at least one complete scan of the predetermined area in which radiant energy is received of sufficient magnitude to cause an output from the level discriminator, the stored information is compared with radiant energy received during the ensuing search scan, which comparison is continued until the received radiant energy is at least as strong as the stored signal, after which the track mode is caused to remain established, and operation thereafter is the same as described hereinabove with respect to FIGS. 1, 2 and 3. The technique thus utilized could be termed a "pause and measure" technique.

More particularly, the star selection circuit operates by allowing, during the initial search scan through the predetermined area, detected radiant energy (of sufficient magnitude to trigger the level discriminator) to cause the search pattern to be interrupted and the track mode initiated. This track mode is retained for four sweeps (two sweeps in each axis) to center the radiant energy in the tracking pattern. The track mode is then retained so that twelve pulses from the level discriminator are received and integrated in the star selection circuit and the voltage level due thereto stored therein. The search mode is then re-established and continued until radiant energy is again received (again of sufficient magnitude to cause an output from the level discriminator) after which the search is again interrupted, as brought out hereinabove.

After at least one complete scan of the predetermined area in which radiant energy is received to trigger the level discriminator at least once, the selection circuit then compares later received radiant energy with the level stored. When the received radiant energy is at least as strong as that stored, the apparatus will be caused to remain in the track mode until such time as the apparatus is deactivated, or the radiant energy is lost.

Figure 10:
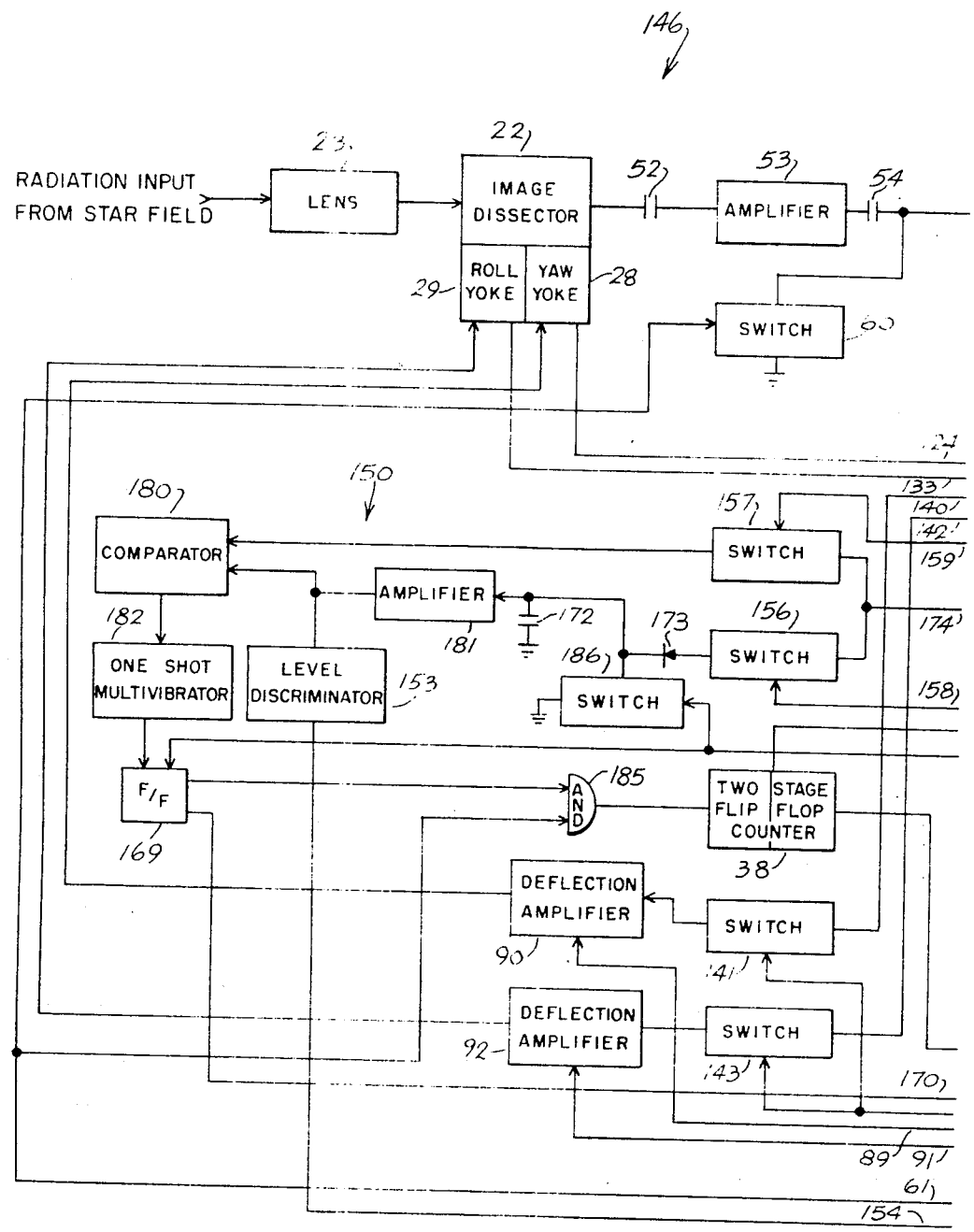
FIGS. 10, 11 and 12 taken together form an expanded block diagram of the embodiment of the invention shown in FIG. 9.
Figure 11:
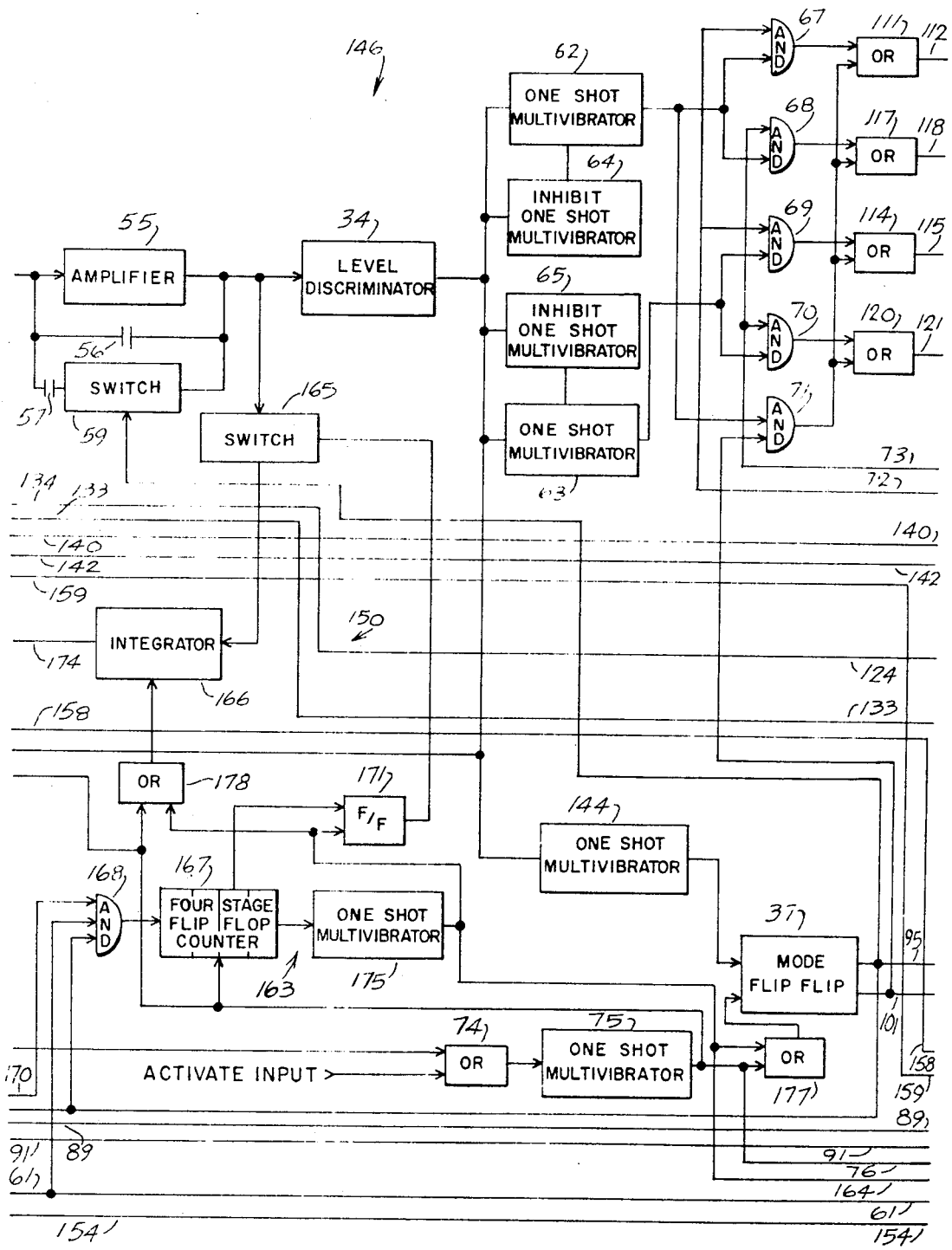
Figure 12:
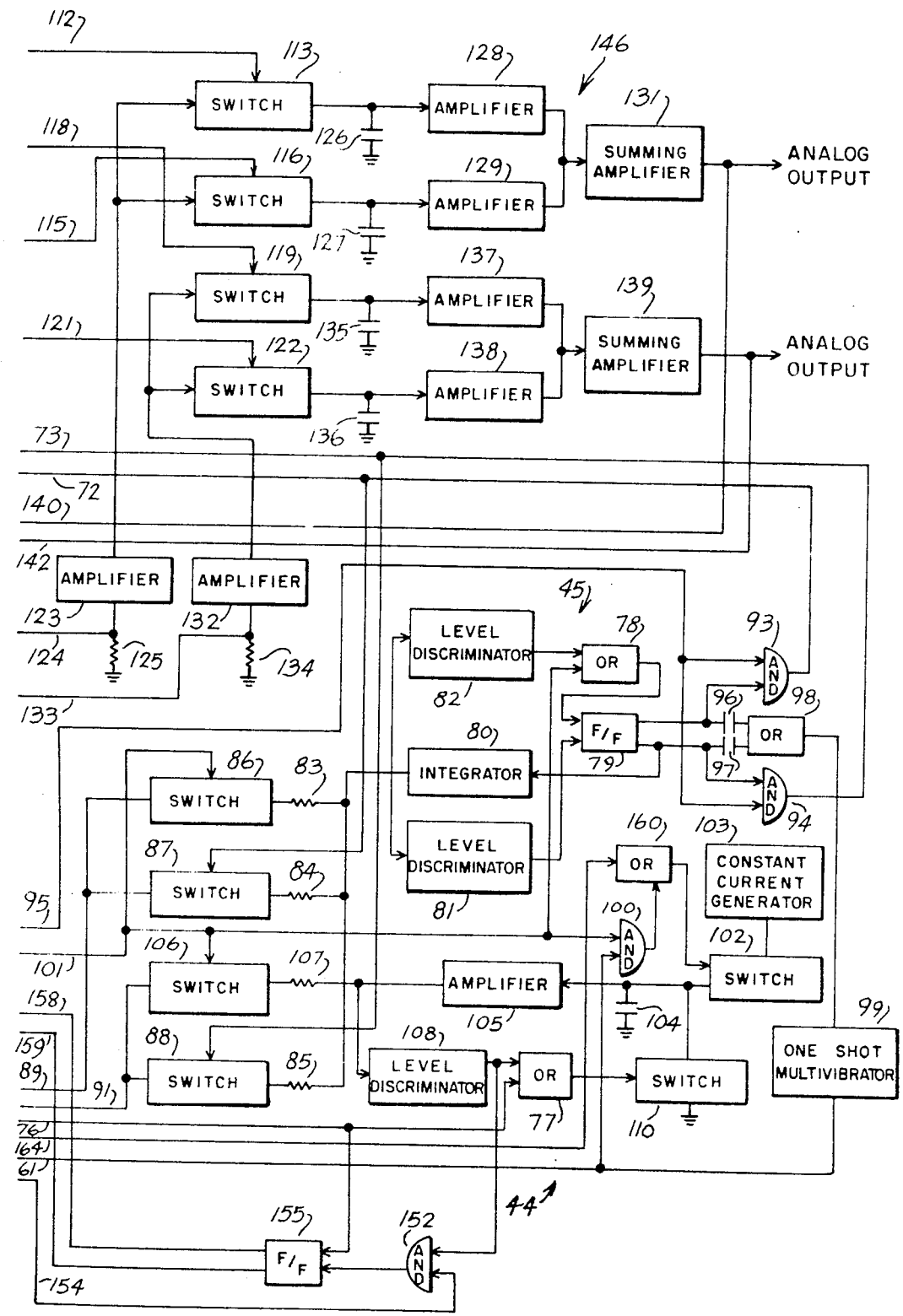
Figure 17:
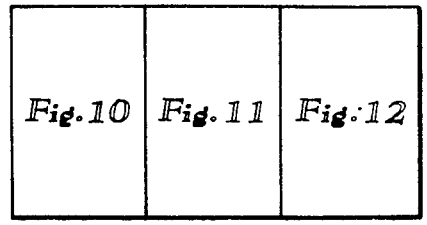

Referring to FIGS. 10, 11 and 12, this expanded block diagram is similar to that shown in FIGS. 2 and 3, except that the star selection circuit and necessary circuitry incident thereto have been added. FIG. 17 illustrates the manner in which FIGS. 10, 11 and 12, are to be placed together to form the composite block diagram.

In the staircase waveform generator, an AND gate 152 has been added, as shown in FIG. 12. AND gate 152 receives the output from level discriminator 108 connected to isolation amplifier 105 and receives a second input from level discriminator 153 in star selection circuit 150 through lead 154. The output from AND gate 152 is coupled to flip-flop 155, which receives a second input from the activate one-shot multivibrator 75 through lead 76. The outputs from flip-flop 155 are coupled to switches 156 and 157 in star selection circuit 150 through leads 158 and 159 to accomplish storing of the highest voltage level and later comparison with the level derived from newly received radiant energy.

In addition, in the staircase waveform generator, OR gate 160 has been added between switch 102 and AND gate 100 to allow switch 102 to be closed by an output from the counter circuitry 163 through lead 164 which forms a part of the selection circuit.

The output from the transducer to the star tracker is coupled thereto through switch 165 controlled by the counter circuitry 163 in the star selection circuitry. The input is taken from amplifier 55 and coupled to integrator 166.

At the time that the search mode is initiated, a four-stage flip-flop counter 167 of counter circuitry 163 is reset by the output from activate one-shot multivibrator 75. Also connected to counter 167 is AND gate 168, which receives a first input from one-shot multivibrator 99, a second input from the set side (track mode) of mode control 37, and a third input from the reset side of flip-flop 169 in the star selection circuit through lead 170.

After four sweeps (two in the yaw axis and two in the roll axis) an output is obtained from the four-stage flip-flop 167 which is coupled to flip-flop 171 to set the same to produce an output which closes switch 165 and permits the radiant energy pulses to be coupled to integrator 166. The output of integrator 166 is coupled to memory capacitor 172 through switch 156, diode 173, and lead 174.

Switch 165 remains closed for twelve additional sweeps and during this time integrator 166 remains connected to the memory capacitor to build the charge thereon. On the sixteenth sweep (four initial sweeps, plus the twelve additional sweeps), the four-stage flip-flop 167 produces an output to trigger one-shot multivibrator 175. The output from this multivibrator is coupled to the reset side of flip-flop 171. This causes switch 165 to open to terminate the input to the integrator. At the time of reset, one-shot multivibrator 175 also provides an output through OR gate 177 to reset mode control 37 to the search mode. An additional output from one-shot multivibrator 175 is also coupled through OR gate 178 to reset integrator 166 and through OR gate 160 to close switch 102 in the staircase waveform generator. Thus, the search pattern is then resumed.

The procedure is then repeated when additional radiant energy is located to trigger level discriminator 34 until such time as the entire predetermined area has been scanned at least once. When radiant energy is later located during the initial scan of the predetermined area, the search is again interrupted and the track mode established for the sixteen sweeps, as brought out hereinabove. If the level of the newly received signal exceeds that of the previous signal, an additional charge is accumulated on the memory capacitor, but if a lower level is obtained, diode 173 does not conduct and the previously stored value on the memory capacitor is not disturbed. After one complete scan of the predetermined area has been completed, wherein at least one source of radiant energy triggers level discriminator 34, the charge on the memory capacitor corresponds to the measured value of the highest level radiant energy in the area under search.

At the end of this complete scan, flip-flop 155 receives an output from AND gate 152 to reset the flip-flop so that the output thereafter from integrator 166 is coupled to comparator 180. When radiant energy is then later received during the output scan to provide an output from amplifier 55 to the integrator, the output from the integrator is coupled directly to the comparator where it is compared with the value stored on the memory capacitor (which is connected to the comparator through amplifier 181). When the value of the received radiant energy is compared and found to equal or exceed the stored value, then comparator 180 provides an output which triggers one-shot multivibrator 182 to produce an output which is coupled to flip-flop 169 to set the same to produce an output that is coupled to AND gate 185. This, of course, terminates the output from the reset side of flip-flop 169 to AND gate 168 connected with four-stage counter 167 and hence, the star selector circuit is rendered incapable of terminating the track mode. At the time of activation of the apparatus, switch 186 is closed to cause memory capacitor 172 to be discharged to ground and assure that initially the memory capacitor starts at zero level.

In operation of the apparatus according to the embodiment of FIGS. 9 through 12, operation is essentially the same as described with respect to the embodiment of FIGS. 1 through 3, except that, as brought out hereinabove, the highest level of radiant energy is first selected and the position of the source of this energy is determined to the exclusion of other radiant energy sources that might be present.

The optical filter 151 (shown only in FIG. 10) is chosen so that a predetermined source of radiant energy will present the highest magnitude of signal. If the sources of radiant energy are stars and Polaris is to be singled out, for example, there are other stars with magnitudes sufficient to be confused with Polaris. But these stars differ from Polaris sufficiently in their effective spectral distribution so that with proper filtering, the radiant energy from Polaris will appear greater than any other star in the field or area of view. Hence, filter 151 is chosen after a particular star has been chosen, and the filter designed to make the chosen star have the highest apparent intensity to the apparatus.

From the foregoing, it can be seen that the apparatus of this invention provides an improved apparatus and method for searching for radiant energy, determining the position of received radiant energy, and tracking the same.

What is claimed is:

1. In a radiant energy sensing apparatus having transducer means for receiving radiant energy from within a preselected area and generating a stream of electrons in response thereto indicative of the position of received radiant energy within said preselected area, electron control means including deflection means for controlling the path of said stream of electrons after generation by said transducer means and drive means connected with said deflection means to effect a segmented search of said preselected area when said electron control means is operated in a first operating condition and to effect repeated unidirectional sweeps with each sweep being in angular relationship to the previous sweep of that portion of any said segment from which radiant energy is received when said electron control means is operated in a second operating condition, signal processing means producing an output signal in response to receipt of said path controlled stream of electrons when of at least a predetermined magnitude, condition control means responsive to an output signal from said signal processing means for causing said electron control means to shift operation to said second operating condition whenever said electron control means is being operated in said first operating condition, and position determining means connected with said electron control means and receiving said output signal from said signal processing means whereby the angular position of received radiant energy within said preselected area is repeatedly determined while said electron control means is being operated in said second operating condition, a radiant energy selection means connected with said transducer means whereby said apparatus is capable of selecting a predetermined source of radiant energy.

2. The apparatus of claim 1 wherein said energy selection means includes comparison means, storage means for storing the level of radiant energy received, and selection control means for causing the highest level of received radiant energy present in said preselected search area to be stored on said storage means and thereafter presenting said stored level to said comparison means along with a received level of radiant energy to preclude position determination of all received radiant energy less than the stored level.

3. In a radiant energy sensing apparatus having transducer means for receiving radiant energy from within a preselected area and generating a stream of electrons in response thereto indicative of the position of received radiant energy within said preselected area, an image dissector plate having an aperture therein, said plate being positioned in the path of said stream of electrons, a pair of deflection yokes effectively positioned between said transducer and image dissector plate for controlling the path of said stream of electrons after generation by said transducer means, a staircase waveform generator, a triangular waveform generator, deflection gate means connecting one of said deflection yokes with said staircase waveform generator and the other with said triangular waveform generator to effect a segmented search of said preselected area when said deflection gate means is operated in a first mode, and connecting both said deflection yokes with said triangular waveform generator to cause repeated unidirectional sweeps of that portion of any said segment from which radiant energy of a predetermined level is received, each succeeding sweep being in quadrature relationship to the previous sweep, when said deflection gate means is operated in a second mode, signal processing mean including a level discriminator producing an output signal in response to receipt of said stream of electrons through said aperture of said image dissector plate representing a level of received radiation above a predetermined minimum value, mode control means responsive to an output signal from said signal processing means for causing said deflection gate means to be operated in said second mode, gating circuits connected with said signal processing means to receive the output signal therefrom and to said triangular waveform generator to receive the triangular waveform output signal therefrom, said gating circuits producing a first output signal indicative of the leading edge of received radiant energy and a second output signal indicative of the trailing edge of received radiant energy, sample and hold circuits connected with said deflection yokes and receiving the output signals from said gating circuits whereby the currents at the times of occurrence of the leading and trailing edges are sampled and stored, averaging means for receiving the current levels sensed by said sample and hold circuits and producing an averaged analog output signal indicative of the center position of received radiant energy along the axis of the sweep producing the averaged current levels, and position information gates connected between said sample and hold circuits and said deflection yokes and controlled by said mode control means whereby said output signal from said sample and hold circuits are coupled to said deflection yokes only when said deflection gate means is being operated in said second mode, a radiant energy selection means comprising: radiant energy selection means connection with said transducer means, triangular waveform generator, and mode control means to cause said mode control means to be shifted from said second mode of operation after a predetermined number of cycles of said triangular waveform generator until said predetermined area has been completely scanned and the highest level of radiant energy located is again within the segment then under search.

4. In a radiant energy sensing apparatus having transducer means for receiving radiant energy from within a preselected area and generating a stream of electrons in response thereto indicative of the position of received radiant energy within said preselected area; electron control means including deflection means for controlling the path of said stream of electrons after generation by said transducer means and drive means connected with said deflection means to effect a segmented search of said preselected area when said electron control means is operated in a first operating condition and to effect repeated unidirectional sweeps with each sweep being in angular relationship to the previous sweep of that portion of any said segment from which radiant energy is received when said electron control means is operating in a second operating condition; signal processing means producing an output signal in response to receipt of said path controlled stream of electrons when of at least a predetermined magnitude; condition control means responsive to an output signal from said signal processing means for causing said electron control means to shift operation to said second operating condition whenever said electron control means is being operated in said first operating condition; and position determining means connected with said electron control means and receiving said output signal from said signal processing means whereby the angular position of received radiant energy within said preselected area is repeatedly determined while said electron control means is being operated in said second operating condition, a radiant energy selection circuit and counter means comprising: radiant energy selection means connected to said transducer means for receiving and storing the level of received radiation and comparing the same with later received radiant energy; and counter means connected between said radiant energy selection means and said condition control means to shift operation of said electron control means to operation in said first operating condition at a predetermined time after a shift from said first operating condition to said second operating condition except when said later received radiant energy is the preselected radiant energy.

5. The apparatus of claim 4 wherein said radiant energy selection means includes an integrator receiving the output from said transducer means, a storage unit for storing received output levels, and a comparator for comparing the level in said storage unit with a later received output signal from said transducer means, and wherein said counter means causes said condition control means to return to operation in said first operating condition until said search area has been completely searched so that the highest level of received radiant energy stored on said storage unit and said highest level of received radiant energy is again within the segment under search.

6. In a process for detecting radiant energy and determining position therefrom, which process includes scanning to produce a repeated pulse output indicative of selected radiant energy and measuring the current at the time the occurrence of each said pulse with said current being indicative of the angular position of said radiant energy within a searched area, a radiant energy selection process comprising: searching an entire area at least one complete time for radiant energy and storing at least one level of received radiant energy found within said area; starting a new search of said area after storing of received radiant energy; and interrupting said new search when radiant energy is again received having a level substantially equal to a predetermined stored level.

7. A process for selecting a predetermined level of radiant energy comprising: searching a predetermined area for radiant energy and storing an indication reflecting at least one level of received radiant energy; starting a new search of said area; comparing at least an indication reflecting the level of radiant energy received during said new search with said stored level indication of radiant energy; and interrupting said new search when radiant energy is received the level indication of which is substantially equal to said level indication of said stored radiant energy.

8. The process of claim 7 wherein said step of storing an indication reflecting at least one level of received radiant energy includes storing the highest level of radiant energy found in said predetermined area.

9. A process for selecting a source radiating the highest level of radiant energy within a preselected search area, said process comprising the steps of: searching a preselected search area during a first time interval and storing at least an indication of the highest level of radiant energy found therein; and searching said preselected search area during a subsequent second time interval during which an indication of the level of received radiant energy is compared with the indication of the level of said stored radiant energy, substantial equality of compared levels indicating that the then received radiant energy is the highest level of radiant energy within said preselected search area.

10. The process of claim 9 wherein said searching a preselected search area during a first time interval includes progressively and independently sensing the level of each source of radiant energy found within said preselected search area and storing therefrom an indication of only the highest level found; and wherein said process also includes providing an indication of radiant energy selection when said substantial equality of compared levels of radiant energy occurs for at least terminating said second time interval searching to facilitate tracking of said radiant energy source.

11. A radiant energy selection circuit, comprising: search means for searching a predetermined area and producing an output indicative of the magnitude of radiant energy received during said search; storing means for receiving said output from said search means during a first time interval, said storing means storing at least one level of received radiant energy and producing an output indicative thereof; and comparator means for receiving said outputs from the search means and said storing means during a second time interval, said comparator means producing an output indicative of a substantial equality between said inputs to said comparator means.

12. The radiant energy selection circuit of claim 11 wherein said outputs from said search means and said storing means are electrical signals indicative of said magnitude of received radiant energy, and wherein said storing means stores an electrical signal indicative of the highest level of radiant energy received.

13. A radiant energy selection circuit for selecting a source radiating the highest level of radiant energy in a preselected area, said circuit comprising: search means for searching a preselected area and producing an output indicative of the magnitude of radiant energy received from each source located during said search; a storage unit for storing the output indicating the largest magnitude of radiant energy received by said search means during a first time interval; and a comparator for comparing the output indicating the magnitude of radiant energy stored in said storage unit with radiant energy received by said search means during a second time interval occurring after said first time interval, said comparator producing an output when substantial identity of compared radiant energy magnitude indications occurs.

* * * * *